(12) United States Patent
Pitts

(10) Patent No.: US 7,143,780 B1
(45) Date of Patent: Dec. 5, 2006

(54) FAUCET HOSE ANTI-TANGLING GUARD FOR A SHUT-OFF VALVE

(76) Inventor: Christina D. Pitts, 724 Glenbar St., Louisville, OH (US) 44641

( * ) Notice: Subject to any disclaimer, the term of this patent is extended or adjusted under 35 U.S.C. 154(b) by 192 days.

(21) Appl. No.: 10/820,934

(22) Filed: Apr. 9, 2004

(51) Int. Cl.
*F16K 27/08* (2006.01)

(52) U.S. Cl. .................. 137/382; 137/375; 70/178

(58) Field of Classification Search ............. 137/375, 137/382; 70/178
See application file for complete search history.

(56) References Cited

U.S. PATENT DOCUMENTS

| | | | | |
|---|---|---|---|---|
| 89,930 | A | * | 5/1869 | Hall .......................... 70/178 |
| 748,720 | A | * | 1/1904 | Glazier ..................... 70/178 |
| 2,662,546 | A | * | 12/1953 | Nelson ...................... 137/382 |
| 3,724,491 | A | * | 4/1973 | Knudsen et al. ............ 137/375 |
| 4,761,839 | A | | 8/1988 | Ganaway |
| 4,777,811 | A | * | 10/1988 | Binkley et al. ............. 70/178 |
| 5,263,853 | A | * | 11/1993 | Pall ........................... 137/382 |
| 5,675,847 | A | | 10/1997 | Pierre |
| 5,771,934 | A | | 6/1998 | Warshawsky |
| 5,934,325 | A | | 8/1999 | Brattoli et al. |
| 5,960,832 | A | | 10/1999 | Warshawsky |
| 6,220,297 | B1 | | 4/2001 | Marty et al. |
| 6,250,338 | B1 | | 6/2001 | Dempsey |
| 6,381,774 | B1 | | 5/2002 | Wales |
| 6,460,570 | B1 | | 10/2002 | Jones et al. |

\* cited by examiner

*Primary Examiner*—A. Michael Chambers
(74) *Attorney, Agent, or Firm*—John D. Gugliotta

(57) ABSTRACT

A faucet hose anti-tangling guard for a shut-off valve is a molded plastic shield that has a prolate shape, divided across a short axis into two portions. The rear portion attaches over a water shut-off valve assembly using two plastic brackets assembled with screws. The front portion is positioned over the valve handle. A recessed aperture in the front portion provides access to the valve handle without removing the invention. A foam gasket prevents the shield from slipping. With the guard in proper position, the faucet hose cannot wrap around the water shut-off valve while the hose is being drawn from its housing for use. The guard also eliminates the possibility of the hose turning the shut-off valve.

7 Claims, 3 Drawing Sheets

FAUCET HOSE ANTI-TANGLING GUARD FOR A SHUT-OFF VALVE

RELATED APPLICATIONS

The present invention was first described in Disclosure Document Registration 529,687 filed on Apr. 10, 2003 under 35 U.S.C. §122, 37 C.F.R. §1.14 and MPEP § 1706. There are no previously filed, nor currently any co-pending applications, anywhere in the world.

BACKGROUND OF THE INVENTION

1. Field of the Invention

The present invention relates generally to faucet hose anti-tangling devices, and more particularly, to a guard attached to a water line at the shut-off valve, the guard preventing entanglement of a faucet hose with the shut-off valve.

2. Description of the Related Art

A kitchen faucet sprayer is a handy, convenient, time-saving device. The sprayer provides water at a point where needed in a gentle stream, making it ideal for quickly and easily washing dishes and/or preparing them for the dishwasher. It is also great for filling large containers that will not fit under the faucet, and is ideal for watering nearby houseplants. It helps conserve water as well by performing its task quickly, thus eliminating excessive water usage. However, one problem that is common to the faucet sprayer is the tendency for the hose to get caught on shut-off valves that are located under the sink as it is being drawn from its housing. This forces the user to stop and go under the sink to remedy the situation, which is aggravating at best.

In light of this problem, there is a need for a way to prevent the spray hose from becoming wrapped around the shut-off valve as it is being drawn from its housing. A faucet hose anti-tangling guard for a shut-off valve does this effectively and simply by encasing the valve so the hose cannot become caught on it. It deflects the hose, allowing for its easy withdrawal from its housing. The homemaker can then quickly, conveniently, and easily wash dishes or prepare them for the dishwasher or use the sprayer for other chores.

A search of the prior art did not disclose any patents that read directly on the claims of the instant invention; however, the following references were considered related:

U.S. Pat. No. 4,761,839, issued in the name of Ganaway, discloses a sink spray and auxiliary attachment device having an upstream and downstream stem integrally joined to a valve housing;

U.S. Pat. No. 5,675,847, issued in the name of Pierre, discloses an under-sink hose retainer comprising a hollow storage container for the hose;

U.S. Pat. No. 5,771,934, issued in the name of Warshawsky, discloses a zinc-based spray faucet hose collar weight for preventing tangling of the faucet hose;

U.S. Pat. No. 5,934,325, issued in the name of Brattoli et al., discloses a pullout faucet wand joint comprising a receptor formed and adapted for mounting on a sink deck, the receptor having an opening for receiving a faucet wand;

U.S. Pat. No. 5,960,832, issued in the name of Warshawsky, discloses a zinc-based spray faucet hose collar weight for preventing tangling of the faucet hose;

U.S. Pat. No. 6,220,297, issued in the name of Marty et al., discloses a pullout spray head comprising an annular elastomeric bushing to reduce play and wobbling of the spray head;

U.S. Pat. No. 6,250,338, issued in the name of Dempsey, discloses a composite faucet hose weight comprising interchangeable interlocking bodies conjoined about a hose to form a single hose weight;

U.S. Pat. No. 6,381,774, issued in the name of Wales, discloses a retractable hose for a faucet; and U.S. Pat. No. 6,460,570, issued in the name of Jones et al., discloses a spray faucet hose weight for nesting the spray nozzle.

Consequently, there exists a continuous need for new ideas and enhancements for existing products in the hose anti-tangling industry.

SUMMARY OF THE INVENTION

It is therefore an object of the present invention to provide an improved faucet or spray hose anti-tangling guard for a shut-off valve and lever.

It is a feature of the present invention to provide a guard comprising a front portion and a rear portion easily coupled or conjoined about a water supply line at the valve lever, the front and rear portions comprising a prolate or spherical shape to prevent entanglement of a hose.

It is another feature of the present invention to provide a guard, wherein the front portion and rear portion each comprise a semi-spherical space or indentation to accommodate receipt and housing of a water supply line therein.

It is yet another feature of the present invention to provide a guard, wherein the front portion comprises a recessed aperture through which the valve lever projects through and partially egresses from, the aperture allowing for easy access and manipulation of the valve lever as required.

Briefly described according to one embodiment of the present invention, a faucet hose anti-tangling guard for a shut-off valve is a molded plastic shield that has a prolate shape, divided across a short axis into two portions. The rear portion attaches over a water shut-off valve assembly using two plastic brackets assembled with screws. The front portion is positioned over the valve handle. A recessed aperture in the front portion provides access to the valve handle without removing the invention. A foam gasket prevents the shield from slipping. With the guard in proper position, the faucet hose cannot wraparound the water shut-off valve while the hose is being drawn from its housing for use. The guard also eliminates the possibility of the hose turning the shut-off valve.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
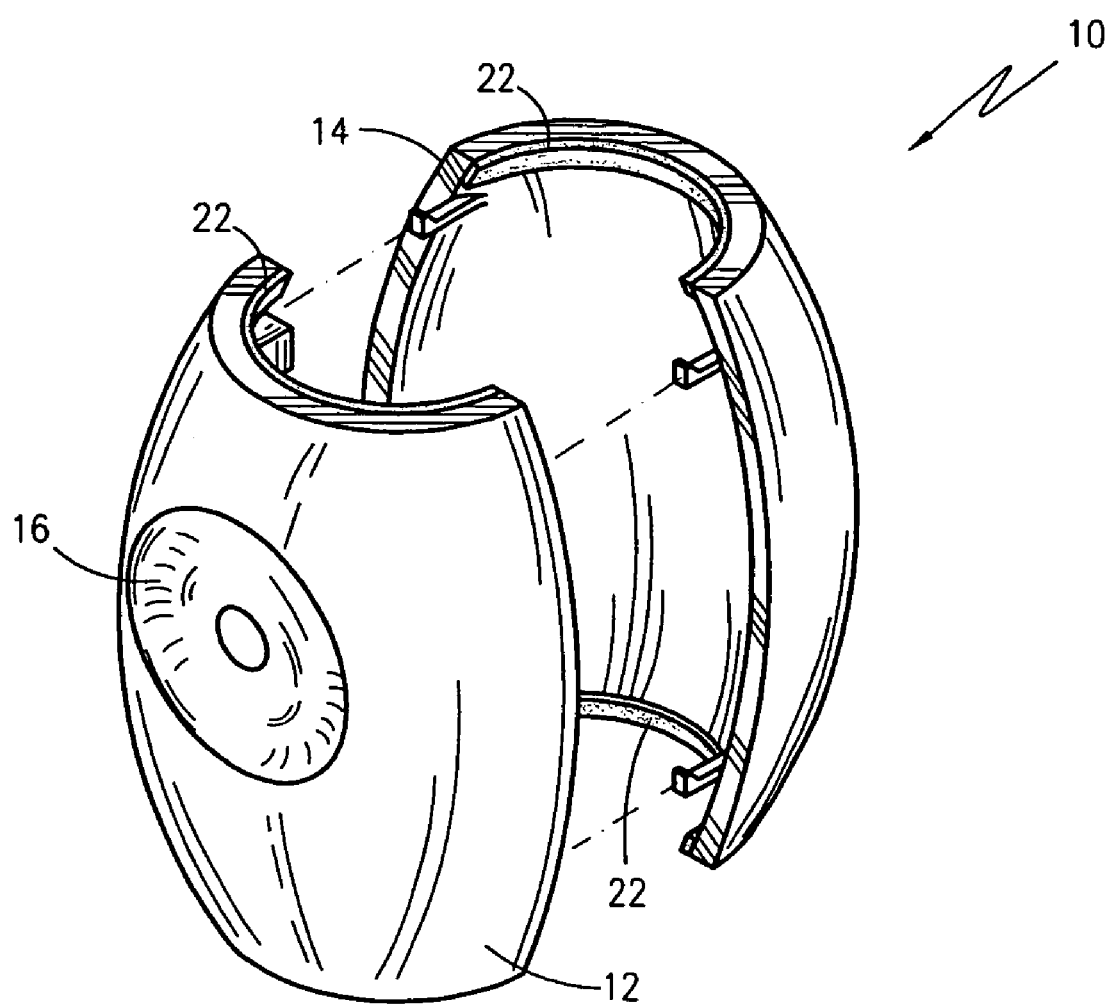
FIG. 1 is an exploded perspective view of a front portion and rear portion that forms a faucet or spray hose anti-tangling guard for a shut-off valve and lever.

The best mode for carrying out the invention is presented in terms of its preferred embodiment, herein depicted within FIGS. 1 through 4.

1. Detailed Description of the Figures

Referring now to FIG. 1 through FIG. 4, a faucet or spray hose anti-tangling guard for a shut-off valve (hereinafter "guard"), generally denoted by reference numeral 10, is shown in accordance with a preferred embodiment of the present invention. The guard 10 comprises a front portion 12 and a rear portion 14, the portions 12 and 14 conjoined or coupled to form a unitary body for placement on the water supply line 50 and about a shut-off valve lever 60 of the line 50. The front portion 14 includes a recessed aperture 16 for exposing the valve lever 60 so that a user may easily access the valve lever 60 without having to remove or displace the guard 10 from the line 50 and valve lever 60.

The portions 12 and 14 may have a variety of exterior forms, such as a curvilinear exterior, including the prolate (pill or football) shape depicted in the figures, or a spherical shape, so long as the shape does not provide severe edges upon which a faucet or spray hose may be entangled about. The prolate or spherical shape of the conjoined portions 12 and 14 to form guard 10 prevent a hose from entangling thereabout, since there are no edges to catch. The portions 12 and 14 are each envisioned as having a hemispherical or semi-spherical indentation 20 for accommodating approximately one-half of the line 50 to which the portions 12 and 14 are affixed. The indentation 20 traverses the longitudinal axis (long axis) of each of the portions 12 and 14. The portions 12 and 14 are envisioned as affixed or conjoined via a plurality of attachment means 18, including integral or insertable threaded screws 18a and/or corresponding nuts or threaded cavities 18b (see FIG. 3), impingement arms 18c and corresponding cavities 18d (see FIG. 2), snap fasteners, or other similarly functioning means. When affixed about the line 50, the portions 12 and 14 substantially circumscribe the external circumference of line 50.

Figure 2:
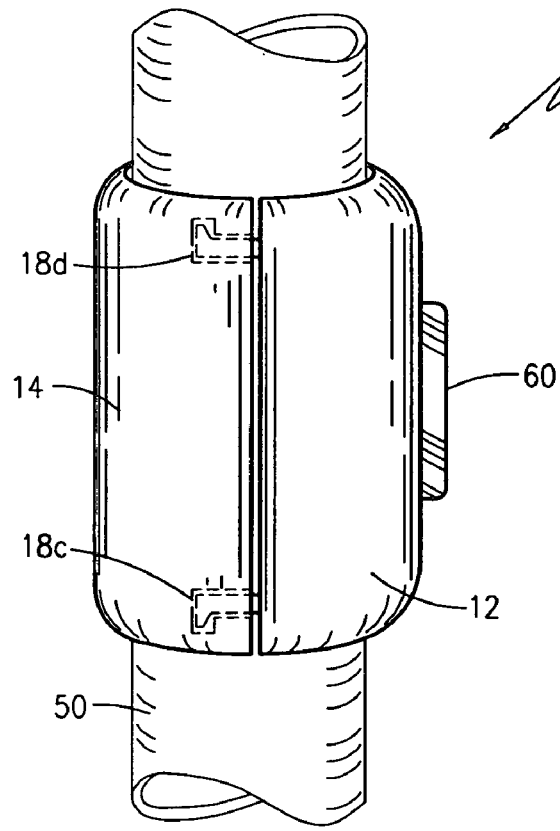
FIG. 2 is a side view of the guard illustrating impingement arms and cavities for attachment means and the partial egress of the valve lever from the aperture of front portion.
Figure 3:
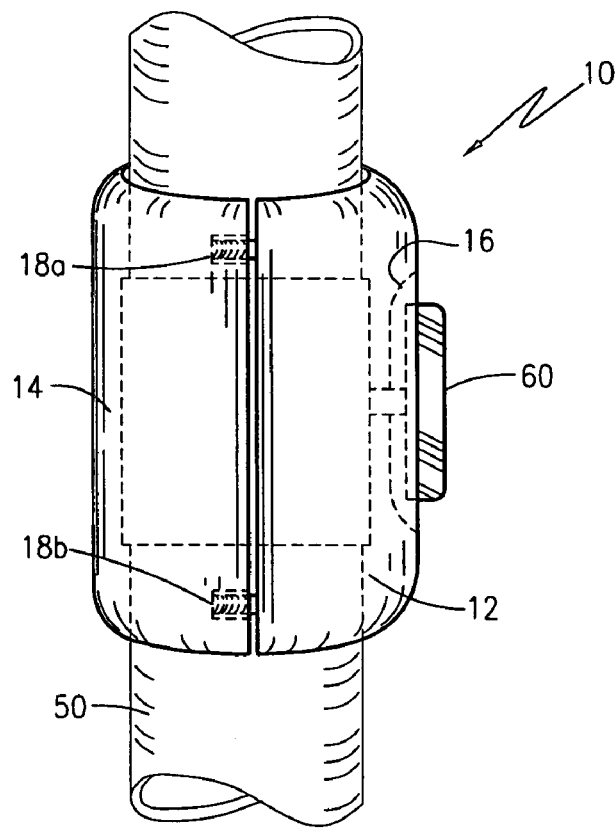
FIG. 3 is a side view of the guard illustrating threaded screws and corresponding threaded cavities for attachment means.
Figure 4:
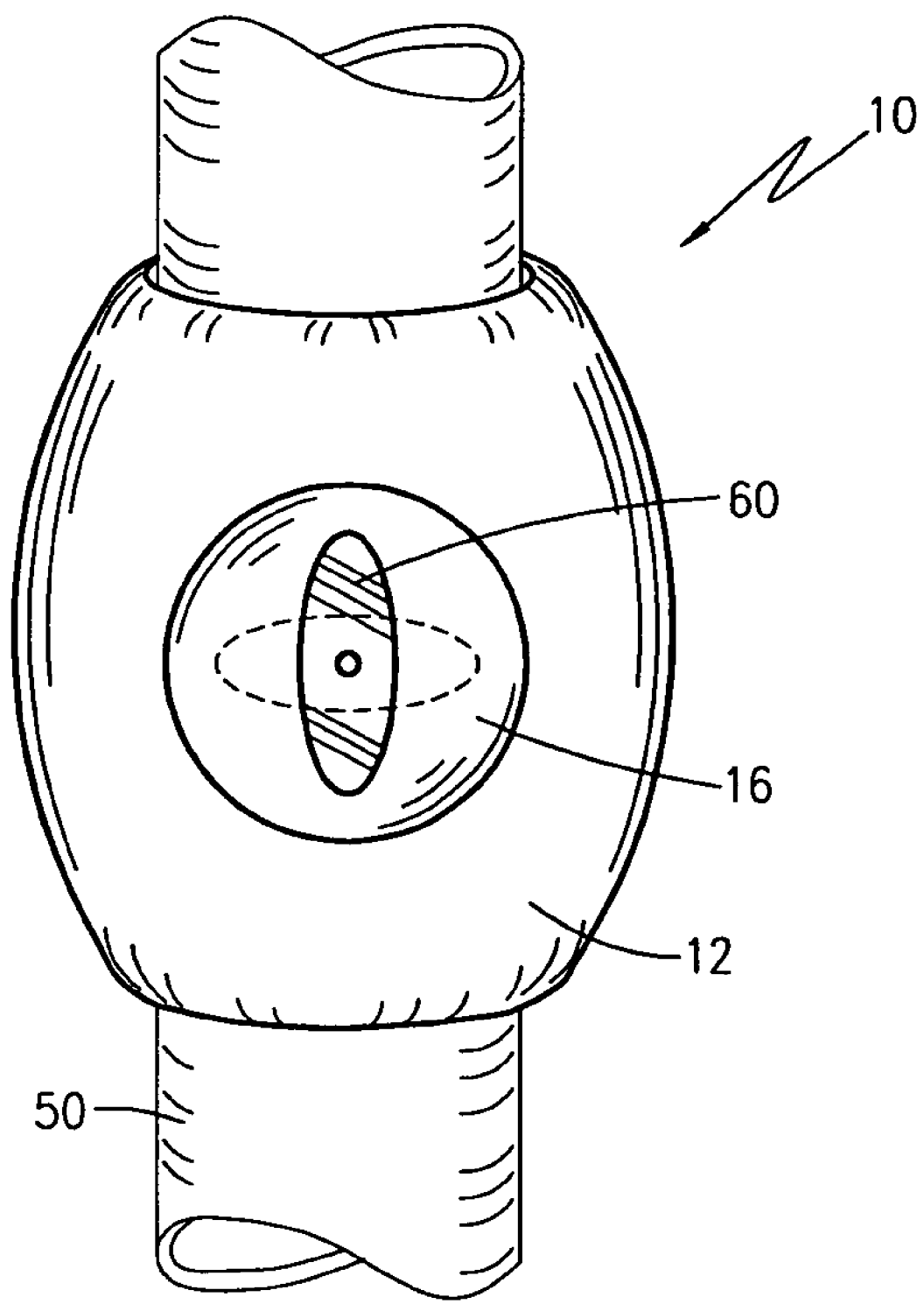
FIG. 4 is a front view of the guard, wherein the valve lever is easily accessible through the front portion via a recessed aperture therein.

The front portion 12 further comprises a recessed aperture 16 for permitting projection of the valve lever 60 therefrom. The aperture 16 provides sufficient space about the valve lever 60 so that a user may easily access the valve lever 60 to open or close the line 50 as required. It is envisioned that the aperture 16 and the front portion 12 are dimensioned to permit egress of valve lever 60 to facilitate access to the valve lever 60. However, the egress of valve lever 60 from aperture 16 is envisioned as only partial egress so that a hose does not tangle about the valve 60. The partial egress envisioned is best illustrated in FIG. 2 and FIG. 3, wherein a substantial thickness of the valve lever 60 is exposed external to the aperture 16, but does not completely project out from the aperture 16 (for the reasons cited).

The portions 12 and 14 may include a foam or rubber gasket(s) 22 about the upper internal circumference and lower internal circumference of the portions 12 and 14, respectively, at the junction where the portions couple or join and along the openings in the top and bottom. The gasket(s) 22 is/are provided to prevent slippage of guard 10 during operation.

Preferably, the guard 10 is fabricated from a durable material, such as metal, plastic or other suitable material. If metal is preferred, treatment with an anti-corrosive agent may be desirable to prevent corrosion of the metal from damp or wet conditions. The guard 10 may be provided in a variety of colors and shapes, particularly coordinated to suit the tastes of the user, including colors and shapes that fit the home decor motifs of the user.

The guard 10 may be fabricated from plastic in an injection mold or other molding techniques using unique mold designs. The use of relatively inexpensive and easily obtainable components is intended to reduce the effective cost of production and the resulting price to consumers.

2. Operation of the Preferred Embodiment

To use the present invention, the user will place the rear portion 14 onto a water supply line 50, aligning the line 50 within a space or indentation 20 that accommodates the shape of the line 50. The front portion 12 is then coupled with the rear portion 14 about the line 50, ensuring that the valve lever 60 inserts into and partially egresses from the aperture 16. The front and rear portions 12 and 14 are conjoined by attachment means 18. The faucet or spray hose is used without worry or hassle that the hose will become entangled by the valve lever 60, thereby restricting water flow through the hose, or in accidentally rotating the lever 60 so that water flow is reduced or restricted.

The foregoing descriptions of specific embodiments of the present invention have been presented for purposes of illustration and description, and are not intended to be exhaustive or to limit the invention to the precise forms disclosed. Obviously many modifications and variations are possible in light of the above teaching. The embodiments were chosen and described to best explain the principles of the invention and its practical application, thus enabling others skilled in the art to best utilize the invention with various modifications as are suited to the particular use contemplated. It is intended that the scope of the invention be defined by the Claims appended hereto and their equivalents. Therefore, the scope of the invention is to be limited only by the following claims.

What is claimed is:

1. A shut-off valve guard comprising:
    a front portion having a recessed aperture exposing a valve lever for manipulative access without having to remove or displace said guard; and
    a rear portion coupling with said front portion and forming a unitary body about said water supply line and circumscribing said shut-off valve;
    wherein said front portion and said rear portion each have a substantially hemispherical interior indentation traversing each longitudinal axis of said front portion and said rear portion, said indentation accommodating said water supply line.

2. The guard of claim 1, wherein said front portion coupling with said rear portion via a plurality of attachment means.

3. The guard of claim 2, wherein said plurality of attachment means comprises threaded fasteners and corresponding threaded cavities.

4. The guard of claim 1, wherein said front portion and said aperture are dimensioned so a thickness of said valve lever to partially projects from said aperture, thereby inhibiting entanglement of said water supply line and said valve lever.

5. The guard of claim 1, wherein said unitary body form a prolate shape without significant edges for entangling said water supply line.

6. The guard of claim 1, wherein said guard is fabricated from plastic.

7. The guard of claim 1 further comprising:
    a first gasket circumscribing an upper internal circumference of said front portion and said rear portion; and
    a second gasket circumscribing a lower internal circumference of said front portion and said rear portion;
    said first gasket and said second gasket preventing said guard from excessive movement along said water supply line during operation.

* * * * *